April 1, 1930. W. F. CONRAN 1,752,836
VALVE
Filed Oct. 8, 1927 2 Sheets-Sheet 1

INVENTOR
William F. Conran
BY
ATTORNEY

April 1, 1930. W. F. CONRAN 1,752,836
VALVE
Filed Oct. 8, 1927 2 Sheets-Sheet 2
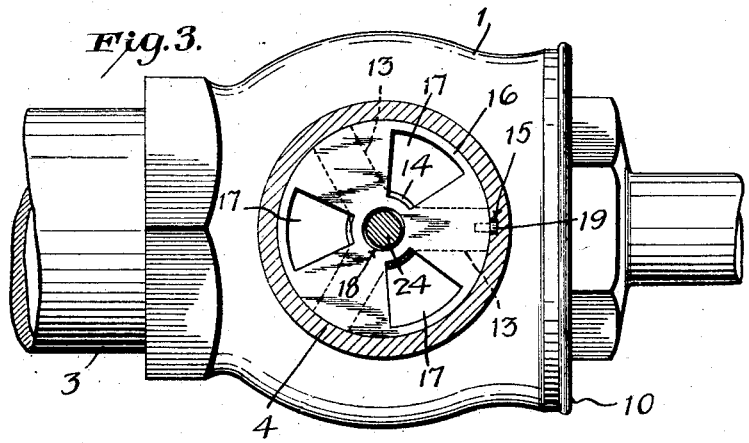
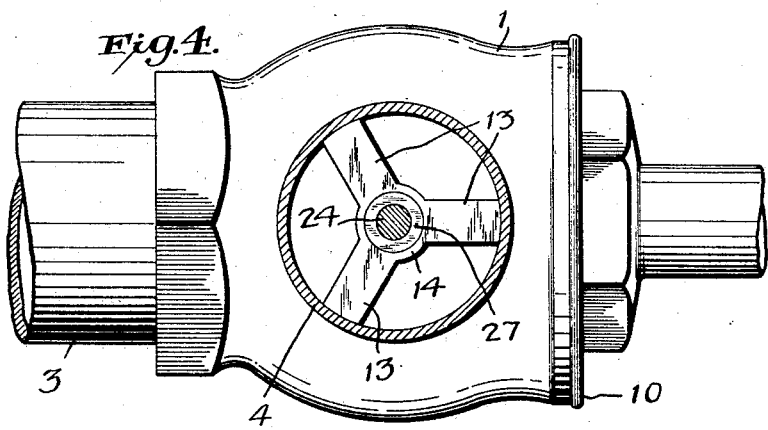
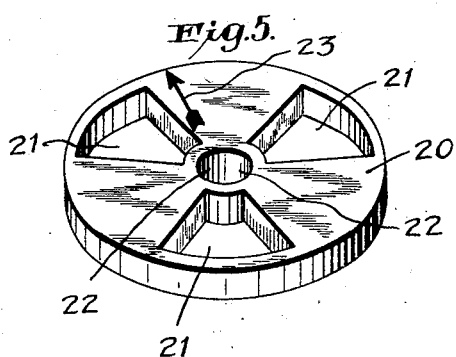
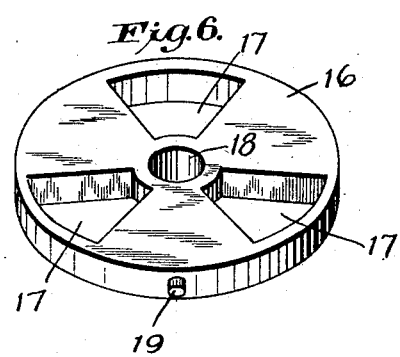
INVENTOR
William F. Conran
BY
ATTORNEY Patented Apr. 1, 1930

1,752,836

UNITED STATES PATENT OFFICE

WILLIAM F. CONRAN, OF BROOKLYN, NEW YORK

VALVE

Application filed October 8, 1927. Serial No. 224,886.

My invention relates to means for controlling fluid flow, and has particular reference to valves controlling the discharge of water to pipe or hose lines.

The principal object of the invention is the provision of a device which may be set to limit the maximum flow through an outlet connection from a system in which different pressures occur at different portions of the system, such as in the fire protection lines in buildings. A further object of the invention is the provision of a device of this character which will be simple and efficient and which will also, while being readily adjustable, be so located that, once set, the adjustment can not be changed or tampered with without disconnecting the line in which it is installed. A still further object of the invention is the provision of a device of this character which is readily adaptable to use with standard valves.

In the accompanying drawings, in which I have illustrated a preferred embodiment of my invention as applied to a standard type of valve:

Fig. 3 is a section taken on the line 3—3 of Fig. 1;

Fig. 4 is a section taken on the line 4—4 of Fig. 1; and

Figs. 5 and 6 are perspective views of certain elements of the apparatus.

Figure 1:
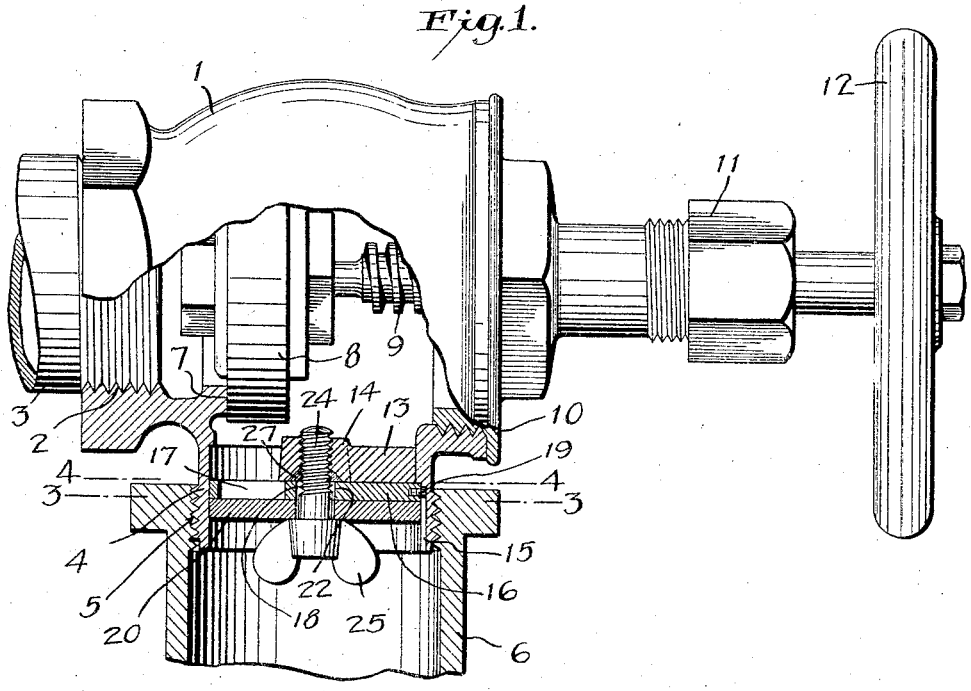
Fig. 1 is an elevation, partly in section, of such a valve equipped with my invention.

Referring now to Fig. 1, 1 represents a standard elbow globe valve casing of the type ordinarily employed for outlet control valves. The casing 1 is formed with an interiorly threaded inlet opening 2, into which is screwed the inlet conduit 3, and with a discharge connection 4 having exterior threads 5 adapted to receive a standard hose coupling or any suitable discharge conduit such as is shown at 6.

Intermediate the inlet and discharge connections, the casing has formed therein the circular valve seat 7 adapted to cooperate with the valve member 8 carried by the stem 9, the latter being threaded in the valve bonnet 10 and passing through a suitable stuffing-box 11. A manually operable wheel 12 controls the position of valve 7. The apparatus so far described is of standard construction, forming per se no part of my invention, and it is to be clearly understood that instead of the form of valve shown, any equivalent may be used without departing from the scope of the invention.

The discharge connection 4 of the valve casing 1 has secured therein a spider comprising a plurality of arms 13 supporting a central boss 14, the latter being centrally bored and threaded. The spider may be secured to the valve casing in any suitable manner when it is desired to apply the invention to a standard valve body, or it may be cast as an integral part of the casing 1 in case a special valve is employed. In the latter event, it is possible to further modify the construction, as will appear hereinafter.

A longitudinal slot 15 is formed in the inner surface of the discharge connection, and a ported disk 16 is fitted into the discharge connection between the end thereof and the spider. The disk 16 is provided with a plurality of ports 17, which in the illustrative form I have shown as three in number but which may be of any size and number desired. It is also provided with a central bore 18, slightly larger in diameter than the threaded aperture through boss 14, and is further provided with a projecting pin 19 adapted to fit in the slot 14 to prevent rotation of the disk.

A second disk 20, similar to disk 16, has ports 21 corresponding to the ports 17 in disk 16 and a central aperture 22 corresponding to the aperture 18. It is further provided with a radial indicator 23, the purpose of which will appear hereinafter. Disk 20 is adapted to be inserted in the discharge opening 4 after the insertion of disk 16, and the two disks are held in position by means of a threaded bolt 24 screwed through boss 14 and passing loosely through the two disks.

The bolt 24 is preferably provided with a winged head 25 to facilitate its adjustment, and it will be quite obvious from the figures that by means of this stud the two disks may be clamped in position to give any free flow area through the ports desired. At the end of the discharge passage 4, the valve housing is provided with an index 26 adapted to cooperate with the indicator 22 to register the position of the disk 20.

Figure 2:
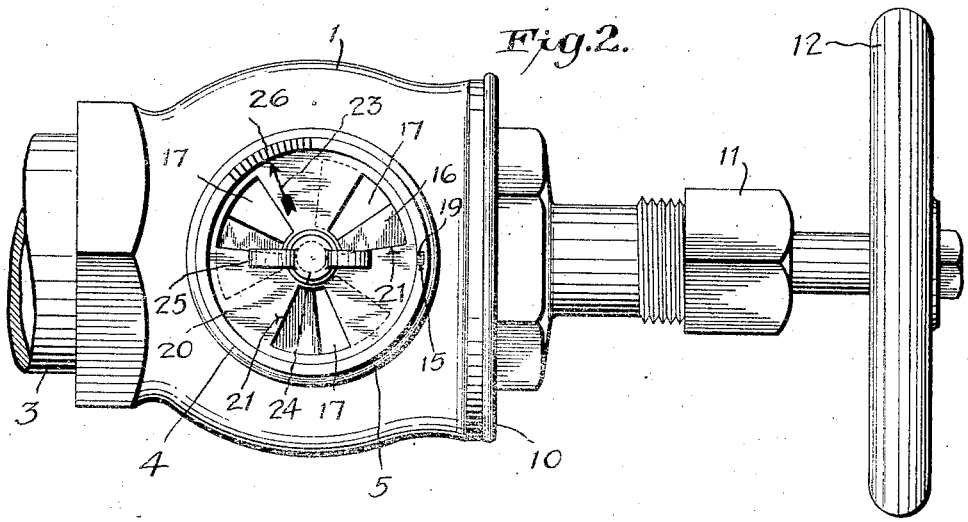
Fig. 2 is a bottom plan view of the same, omitting the disharge pipe.

As appears most clearly from Fig. 2, it will be apparent that rotation of the disk 20 with respect to the fixed disk 16 will serve to limit the discharge capacity of the valve regardless of the degree of opening of the main valve member 8, and in practice the disk 20 is clamped in the position which will give the desired maximum discharge from the valve, the index 26 serving to aid in accurately fixing the size of the discharge opening. As will further be evident from the drawings, the subsequent coupling of the discharge hose or other connection to the valve serves to enclose the entire device so that the adjustment can not be tampered with unless the connection is broken.

In the majority of instances the outlet opening of the valve casing forms the most convenient location for the device embodying the invention, and I have shown it in this position in the illustrative form, but it will be apparent that the specific location of the device with respect to the main valve is not essential, and that in so far as the operation of the device is concerned, it may be equally well placed on the inlet side of the valve.

In order to facilitate removal of the disks 16 and 20 from the body of the valve, I prefer to counterbore the boss 14 and insert in the counterbore a small conical washer 27, suitably threaded to engage the bolt 23. With this washer in position, the bolt 24 may be backed out until it is released from the spider, at which time the bolt may be pulled directly out, carrying with it the disks 15 and 19, the latter being held on the bolt by the washer 27 which still remains in threaded engagement with the bolt and acts as a retaining collar.

Where, as previously noted, a special valve body is employed in which the spider is made integral with the casing 1, it will be obvious that this spider can be made in the same form as the disk 16, in which event the latter may be omitted and the single, separate disk 20 employed. With this form of apparatus the disk 20 and the spider would cooperate to form port openings in precisely the same manner that the disks 16 and 20 do in the form illustrated.

From the foregoing description it will be apparent that by my invention I have provided an extremely simple and rugged device by which the capacities of standard valves may be readily adjusted to the needs of specific applications, and while I have, for illustrative purposes, shown a preferred embodiment of the invention, it is to be understood that the form chosen is illustrative only and the invention is not to be limited thereby, but is to be considered as including all such forms and modifications as may fall within the scope of the appended claims.

I claim:

1. In a water distribution system for buildings, the combination with a fluid conveying conduit comprising a plurality of sections and including an externally operable closure valve controlling flow through the conduit, of means forming an adjustable auxiliary flow controlling opening in said conduit in the vicinity of said valve, and means wholly enclosed by the walls of said conduit and accessible only by dismembering the conduit for securing said first-named means in a fixed selective position to provide a predetermined maximum opening through said conduit.

2. In a water distribution for buildings, a valve casing having inlet and discharge openings, an externally operable closure valve in said casing controlling flow therethrough, means fixed transversely of one of said openings and forming a port having an area less than that of the opening, a rotatable element in said opening adapted to be clamped against said means, said element being provided with a port therethrough cooperating with said first-named port to vary the free flow area through said opening as said element is rotated, means for holding said first-named means and said element in fixed position with respect to each other, and a conduit member connected with said opening, said rotatable element and holding means being wholly enclosed by said valve casing and conduit element so as to be accessible only by disconnecting the same.

3. In a water distribution for buildings, a valve casing having a discharge opening, an externally operable closure valve in said casing controlling flow therethrough, a disk fixed transversely of said opening and having a plurality of ports therein, a second correspondingly ported disk rotatably mounted in said opening, means for clamping said disks in fixed position with respect to each other, and a conduit member connected with said opening, said rotatable element and holding means being wholly enclosed by said valve casing and conduit element so as to be accessible only by disconnecting the same.

4. In a water distribution for buildings, a valve casing having a discharge opening, an externally operable closure valve in said casing controlling flow therethrough, a spider fixed across said opening and having a centrally located threaded aperture, a ported disk outside of said spider having a centrally located bore and adapted to be inserted in said opening, means for securing said disk against rotation in said opening, a rotatable correspondingly ported and bored disk adapted to be inserted in said opening outside of the first disk, and a bolt passing through said bores and threaded into said aperture to clamp said disks in fixed position in said opening.

5. In apparatus of the class described, a valve casing having a discharge opening, a spider fixed across said opening and having a centrally located threaded aperture, a ported disk having a centrally located bore and adapted to be inserted in said opening, means for securing said disk against rotation in said opening, a second correspondingly ported and bored disk adapted to be inserted in said opening, an indicator on said second disk cooperating with an index on said casing to indicate the relative position of the ports in said disks, and a bolt passing through said bores and threaded into said aperture to clamp said disks in fixed position in said opening.

6. In a casing having an opening therein, a spider fixed across said opening and having a centrally located threaded aperture, a ported disk having a centrally located bore adapted to be inserted in said opening against said spider, a bolt passing through the bore in said disk and threaded into said aperture to secure said disk in position, and a washer threaded on said bolt between said spider and said disk to retain said disk on the bolt when the bolt is removed from said spider.

7. In a casing having an opening therein, a spider fixed across said opening and having a centrally located threaded aperture, a stationary ported disk having a centrally located bore adapted to be inserted in said opening against said spider, a rotatable ported disk adapted to be inserted in said opening against the first disk, a bolt passing through the bores in said disks and threaded into said aperture to secure said disks in position, and a washer threaded on said bolt between said spider and said disk, to retain said disks on the bolt when the bolt is removed from said spider.

8. A water valve comprising a body containing a closure valve seat and a valve member cooperating with said seat to command the flow through the body, and an adjustable device mounted within the valve body in the path of the entirety of the flow through the valve, said device having internal means for securing said device in a fixed selective position to provide a predetermined maximum opening through the valve body, said means being so disposed as to be wholly enclosed when the valve is connected in a fluid-conveying conduit in order that the adjustment may not be changed or tampered with without disconnecting the line in which the valve is installed.

9. A water valve comprising a body containing a closure valve seat and a valve member cooperating with said seat to command the flow through the body, and an adjustable rotary shutter device mounted within the valve body in the path of the entirety of the flow through the valve, said device having internal means for securing said device in a fixed selective position to provide a predetermined maximum opening through the valve body, said means being so disposed as to be wholly enclosed when the valve is connected in a fluid-conveying conduit in order that the adjustment may not be changed or tampered with without disconnecting the line in which the valve is installed.

WILLIAM F. CONRAN.